United States Patent
Ishiguro et al.

(10) Patent No.: US 7,217,036 B2
(45) Date of Patent: May 15, 2007

(54) SEALED BALL BEARING

(75) Inventors: Hiroshi Ishiguro, Fujisawa (JP);
Toshihisa Ohata, Fujisawa (JP);
Yasuhiro Hirayama, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/494,450

(22) PCT Filed: Nov. 8, 2002

(86) PCT No.: PCT/JP02/11693

§ 371 (c)(1),
(2), (4) Date: Apr. 30, 2004

(87) PCT Pub. No.: WO03/042563

PCT Pub. Date: May 22, 2003

(65) Prior Publication Data

US 2005/0063626 A1    Mar. 24, 2005

(30) Foreign Application Priority Data

Nov. 13, 2001 (JP) .............................. 2001-348043

(51) Int. Cl.
*F16C 33/76* (2006.01)
(52) U.S. Cl. ...................... 384/484; 277/552; 277/500
(58) Field of Classification Search .............. 74/477, 74/479, 481, 482, 484, 485, 491; 277/422, 277/500, 552; 384/477, 479, 481, 482, 484, 384/485, 491
See application file for complete search history.

(56) References Cited

U.S. PATENT DOCUMENTS

| 3,869,181 | A | * | 3/1975 | Barber ........................ 384/482 |
| 4,505,484 | A |   | 3/1985 | Ohkuma et al. |
| 4,533,265 | A | * | 8/1985 | Woodbridge ................. 384/477 |
| 4,854,749 | A | * | 8/1989 | Kohigashi et al. .......... 384/482 |
| 5,544,963 | A | * | 8/1996 | Kajihara et al. ............ 384/482 |

FOREIGN PATENT DOCUMENTS

| EP | 1035342 A2 | 9/2000 |
| JP | 2001-289256 A | 10/2001 |

OTHER PUBLICATIONS

Microfilm of the specification and drawings annexed to the request of Japanese Utility Model Application No. 64616/1983 (Laid Open No. 168519/1984) (Mazda Motor Corp.), Nov. 12, 1984 (Full text).

* cited by examiner

*Primary Examiner*—Thomas R. Hannon
*Assistant Examiner*—Justin Krause
(74) *Attorney, Agent, or Firm*—Crowell & Moring LLP

(57) ABSTRACT

In a seal-type rolling bearing, between an inner ring and an outer ring, contact-type seal plates are respectively interposed on the counter-water-drenchable side and on the water-drenchable side. On the counter-water-drenchable side, a seal plate including, in the lip leading end portion thereof, an air hole for controlling the internal and external pressures of the bearing is disposed. On the water-drenchable side, a seal plate without air hole is disposed.

2 Claims, 5 Drawing Sheets

COUNTER-WATER-DRENCHABLE SIDE though not shown, in the inside diameter surface of the outer ring, there are arranged two (double row) raceway surfaces on which the rolling body 6 can roll, while, in the outside diameter surface of the inner ring 2, there are similarly formed two (double row) raceway surfaces corresponding to the two raceway surfaces formed in the outer ring 4.

SEALED BALL BEARING

TECHNICAL FIELD

The present invention relates to a sealed-type rolling bearing including two contact-type seal plates on the two right and left sides thereof between an inner ring and an outer ring.

BACKGROUND ART

Conventionally, in a vehicle such as a car, in a seal-type rolling bearing for use in a power transmission pulley, an electromagnetic clutch or the like used to transmit power to a compressor included in a refrigeration cycle, there are disposed a total of two contact seals (seal plates) one on either side thereof to thereby attain a sealed condition.

In each of the seal lips of the two-side seal plates, there is formed an air hole (or a slit) in at least one portion thereof in the circumferential direction thereof.

The reason for this is as follows: that is, in case where a contact seal bearing without air hole is incorporated, when the pressure of the interior of the bearing rises and lowers, the internal and external pressures of the bearing cannot be equalized, which incurs a fear that there can occur seal removal, seal lip adsorption phenomenon or the like; and, therefore, there is proposed a bearing in which, by escaping the air through the air hole to thereby equalize the pressure of the interior of the bearing with the pressure of the exterior thereof, the above-mentioned seal removal, seal lip adsorption phenomenon or the like can be prevented (for example, JP-UM-B-6-50655, JP-UM-A-6-73454, and the like).

However, in the conventional contact seal (seal plate) bearing having an air hole, when the bearing at a high temperature is drenched with water drawn in from outside and is thereby cooled suddenly (for example, when a vehicle passes through a puddle of water while it is running), the pressure of the interior of the bearing is lowered suddenly, so that, at the same time when the air is drawn in through the air hole, the water existing outside is also sucked in through the air hole, which reduces the life of the bearing outstandingly.

The present invention at eliminating the above-mentioned drawbacks found in the conventional bearings. Accordingly, it is an object of the invention to provide a seal-type rolling bearing which not only can secure a high seal sealing performance but also can equalize the pressure of the interior of the bearing with the pressure of the exterior thereof.

DISCLOSURE OF THE INVENTION

Technical means provided by the invention in attaining the above object is a bearing for incorporation into a power transmission pulley or an electromagnetic clutch, wherein, between an inner ring and an outer ring, there are interposed two contact-type seal plates respectively on the counter-water-drenchable side and water-drenchable side thereof, on the counter-water-drenchable side, there is disposed the seal plate having an air hole formed in the leading end of a lip thereof for controlling the pressures of the interior and exterior of the bearing, and, on the water-drenchable side, there is disposed the seal plate without air hole.

Also, in a rolling bearing including two contact-type seal plates respectively on the two right and left sides thereof between an inner ring and an outer ring, only the contact-type seal plate on one side thereof includes, in the lip leading end thereof, an air hole for controlling the pressures of the interior and exterior of the bearing, and, according to the using conditions, the provision directions of the contact seal including an air hole and the seal on the opposite side can be optimized.

Figure 1:
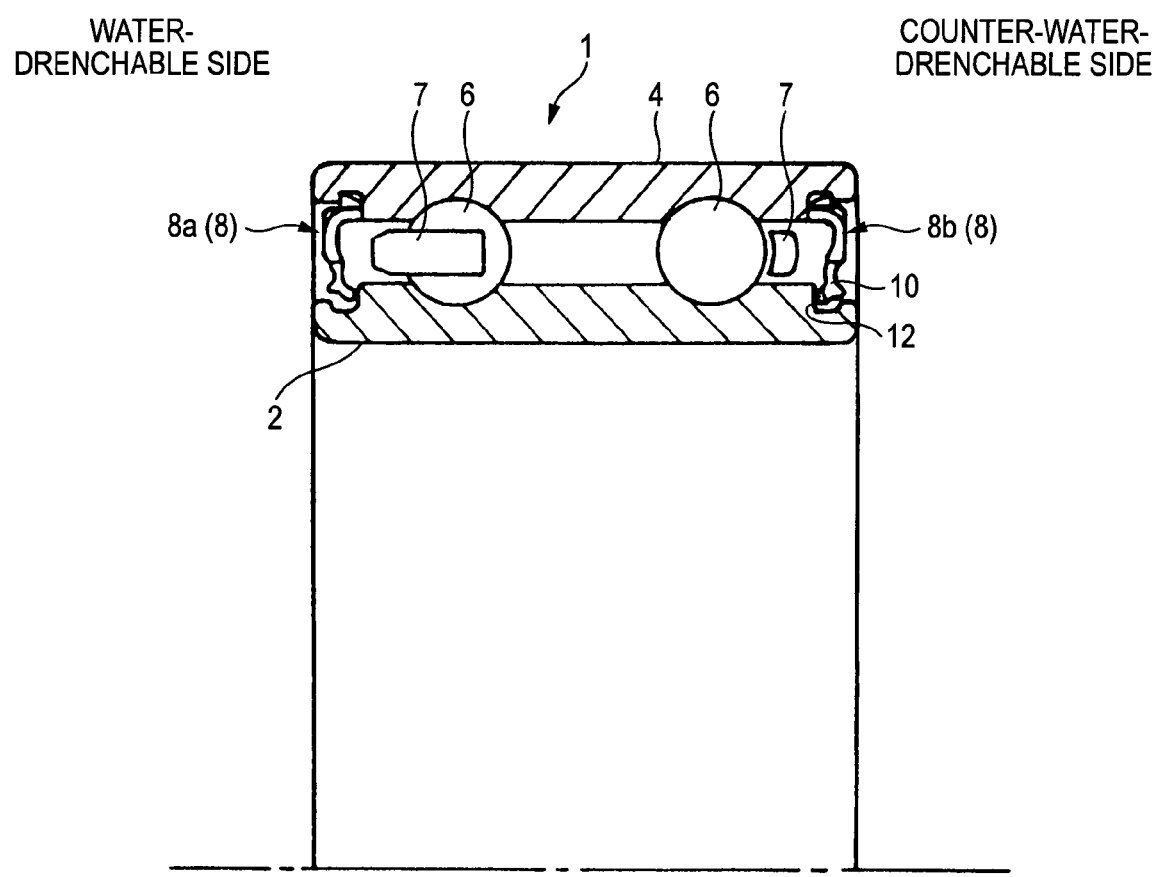
FIG. 1 is a partially longitudinal section view of an embodiment of a seal-type rolling bearing according to the invention.
Figure 2:
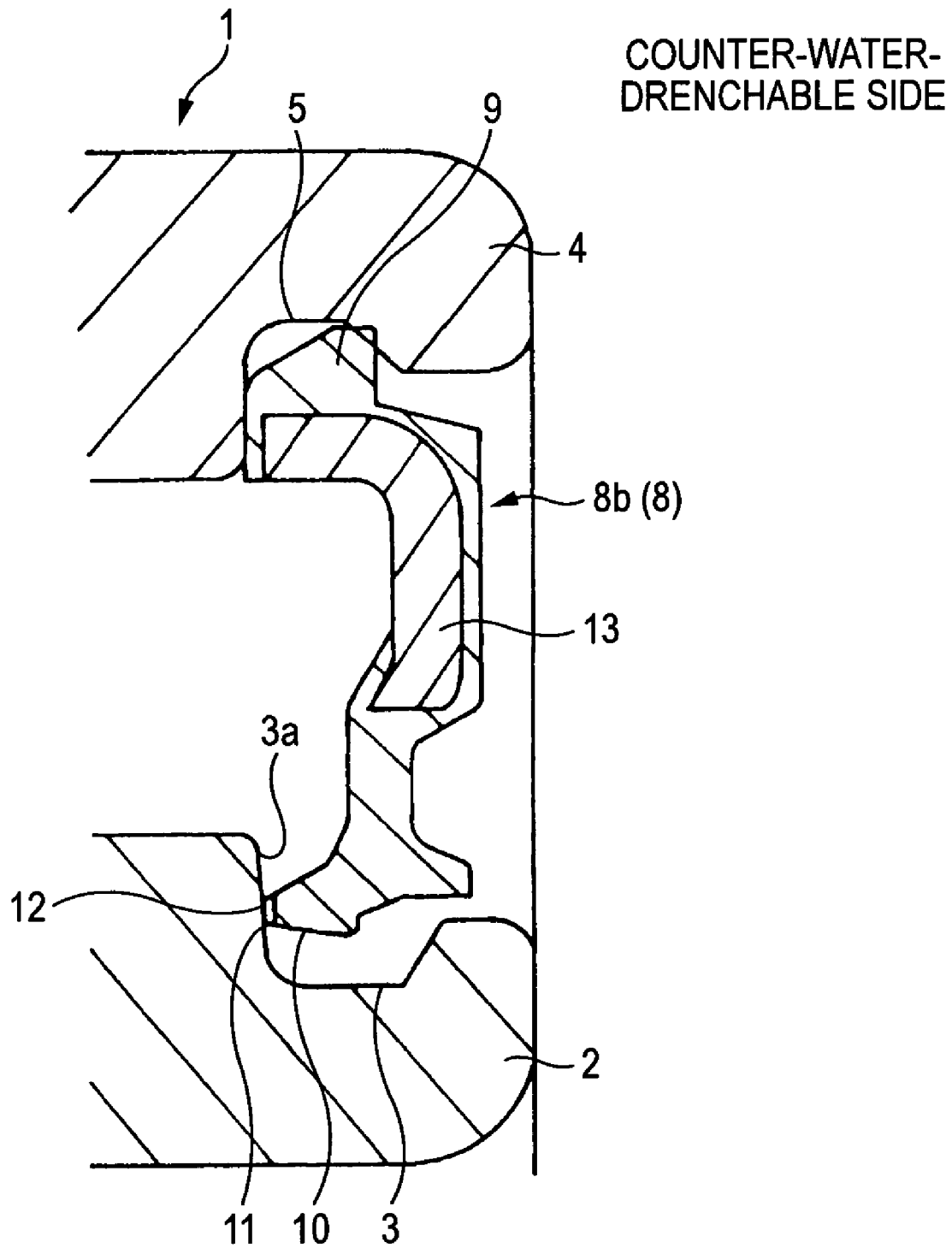
FIG. 2 is an enlarged longitudinal section view of the seal plate portion on the counter-water-drenchable side of the embodiment shown in FIG. 1.
Figure 3:
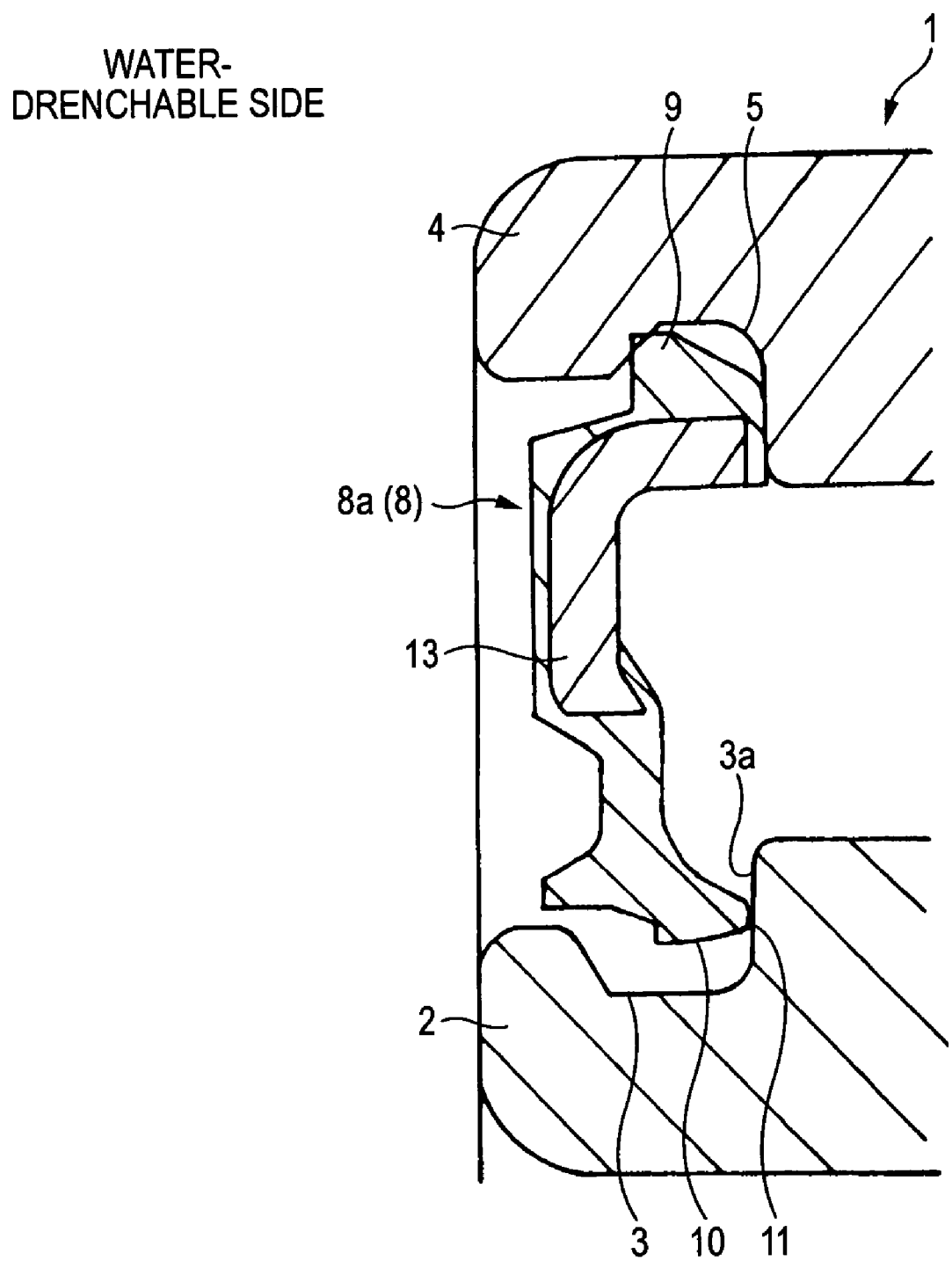
FIG. 3 is an enlarged longitudinal section view of the seal plate portion on the water-drenchable side of the embodiment shown in FIG. 1.

By the way, referring to the reference characters used in the drawings, 1 designates a seal-type rolling bearing, 2 an inner ring, 4 an outer ring, 8a a water-drenchable-side seal plate, 8b a counter-water-drenchable-side seal plate, 10 a lip, 12 an air hole, 14 a power transmission pulley, and 17 an electromagnetic clutch, respectively.

BEST MODE FOR CARRYING OUT THE INVENTION

Now, description will be given below of an embodiment of a seal-type rolling bearing according to the invention.

In the present embodiment, there is typically disclosed a double-row angular ball bearing for describing an embodiment of a seal-type rolling bearing according to the invention. However, the double-row angular ball bearing is not limitative but it can also be changed properly to other bearing such as a combined angular ball bearing without departing from the scope of the invention.

FIG. 1 is a partially longitudinal section view of a seal-type rolling bearing 1 according to the present embodiment; and, the bearing 1 comprises an inner ring 2, an outer ring 4, a rolling body 6, a retainer 7, and two seal plates 8.

By the way, in the case of the inner ring 2, outer ring 4, a rolling body 6 and retainer 7, their structures are not limited to those employed in the present embodiment, but conventionally known structures can also be applied thereto within the scope of the invention. Thus, the detailed description thereof is omitted here.

Each of the seal plates 8 is formed as a disk-shaped body as a whole made of elastic material such as rubber or synthetic resin, while the seal plate 8 is disposed in such a manner that its outside diameter 9 side is fixed to a peripheral groove 5 formed in the inside diameter surface of the outer ring 5 by calking or by similar means and its inside-diameter-side lip 10 is contacted with a peripheral groove formed in the outside diameter surface of the inner ring; and, the two seal plates 8 are interposed between the inner and outer rings 2, 4 respectively on the two right and left sides of the bearing. And, an air hole 12 is formed only on the leading end (end face) 11 side of the lip 10 of the counter-water-drenchable-side seal plate (contact seal) 8b, whereas no air hole is formed in the lip 10 of the water-drenchable-side seal plate (contact seal) 8a.

The air hole 12 is formed in the leading end (end face) 1 of the lip 10 in contact with a peripheral-groove wall surface 3a formed in the inner ring outside-diameter surface in such a manner that it penetrates through the lip 10 leading end face in the diameter direction thereof.

In the case of the air hole 12, one or more air holes 12 are formed at intervals. In case where two or more air holes 12 are formed, the positions of the air holes 12—may be the same in the peripheral direction of the lip 10 or may be shifted from each other; and, the intervals between the air holes 12—may be the same or may be different. That is, the positions and intervals of the air holes 12 can be selected arbitrarily within the scope of the invention.

Also, the air holes 12 may also be composed of continuous grooves which are formed in the end face 11 of the lip 10 in contact with the wall surface 3a so as to communicate with each other in the diameter direction of the end face 1 (not shown) In this case as well, there can be obtained similar operation and effects to the previously described air hole.

In this case, the diameter and the number of grooves can be selected arbitrarily as well as the shape of grooves is not limited to a straight shape but can be selected arbitrarily.

The contact seal 8 according to the present embodiment includes a core metal 13. However, the shape of the core metal 13 is not limited to a specific shape. Also, there may also be used a contact seal which does not include a core metal.

Further, the shape of the lip 10 is not limited to the illustrated shape at all, but any other shape can also be used arbitrarily within the scope of the invention, provided that it has a known structure including the end face 11 to be contacted with the peripheral groove 3. That is, except for a structure in which the air hole 12 is formed in the lip 10, any one of the known structures may be applied as the whole structure of the seal plate 8.

Therefore, since the counter-water-drenchable-side contact seal 8b includes the air hole 12 on the leading end (end face) 11 side of the lip 10 and thus, even in case where the internal pressure of the bearing is lowered due to the sudden cooling of the bearing, the external and internal pressures of the bearing can be equalized with each other, there is no possibility that adsorption can occur in the seal lip 10. On the other hand, in the case of the water-drenchable-side contact seal 8a, because no air hole 12 is formed in the lip 10 thereof, even in case where the bearing is cooled suddenly because it is drenched to the water, there is no possibility that the water can be drawn in from outside.

Figure 6:
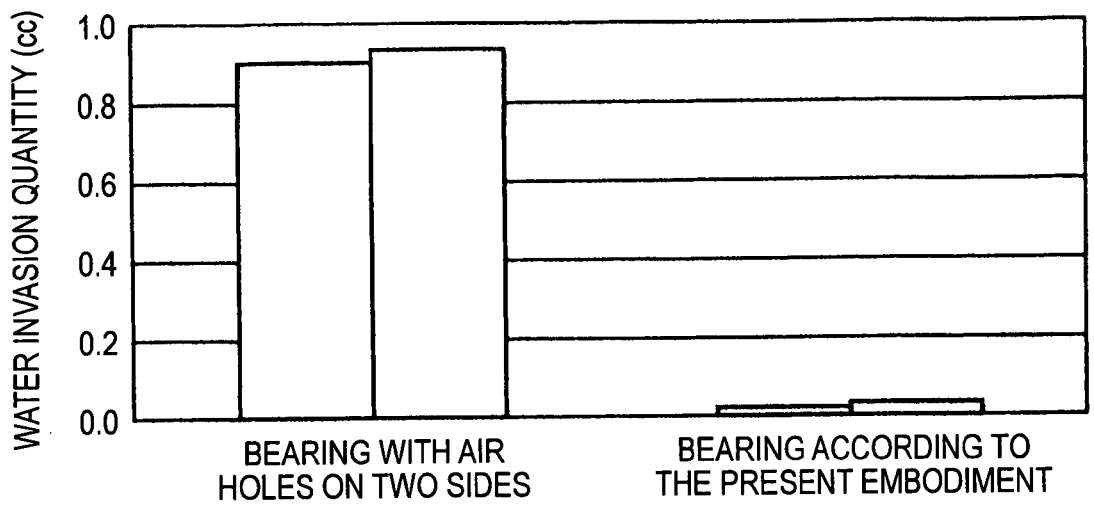
FIG. 6 is a view of the results of a bearing water pouring test.

Now, FIG. 6 shows the results of a bearing water pouring test.

[Test Conditions]

Bearing temperature: water is poured after bearing is held at temperature of 120° C. for 1 h.
Number of revolutions: 1600 rpm
Quantity of water poured: 540 cc/min
Time: 10 min.

The test results show that the bearing 1 according to the present embodiment, in which the water-pouring-side (the water-drenchable-side) contact seal 8a has no air hole and the counter-water-pouring-side (the counter-water-drenchable-side) contact seal 8b has an air hole 12, is more excellent in the sealing performance than a comparison bearing in which each of the two side contact seals has an air hole.

Figure 7:
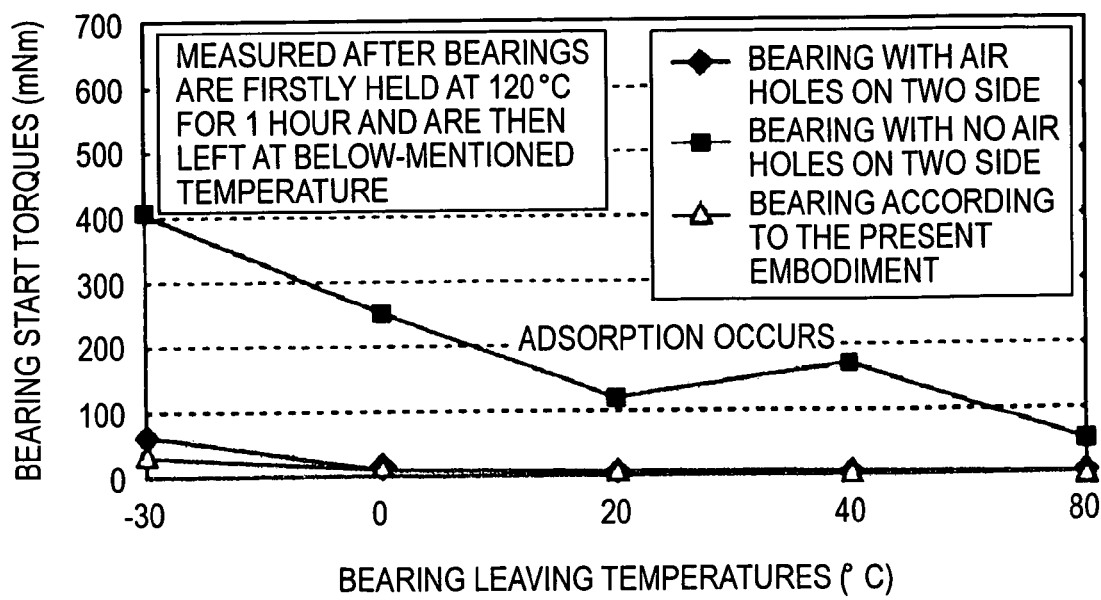
FIG. 7 is a view of the results of a seal lip adsorption test (bearing start torque).

Also, FIG. 7 shows the results of a seal lip adsorption test.

In the present test, after the bearing according to the present embodiment and two comparison embodiments are previously held under the condition of 120° C.×1 h and are then left at a desired temperature, start torques due to the adsorption of the seal lips were measured.

The adsorption test results show the following fact: that is, in the case of a comparison embodiment in which no air hole is formed in the two side contact seals thereof, there is found an increase in the start torque due to the adsorption of the lips at any one of temperatures in the range −30° C.~−8° C.; and, in the bearing 1 according to the present embodiment in which the water-pouring-side (the water-drenchable-side) contact seal 8a has no air hole and the counter-water-pouring-side (the water-drenchable-side) contact seal 8b has the air hole 12, there is found no adsorption and thus the internal and external pressures of the bearing are kept equalized to each other.

EMBODIMENTS

First Embodiment

Figure 4:
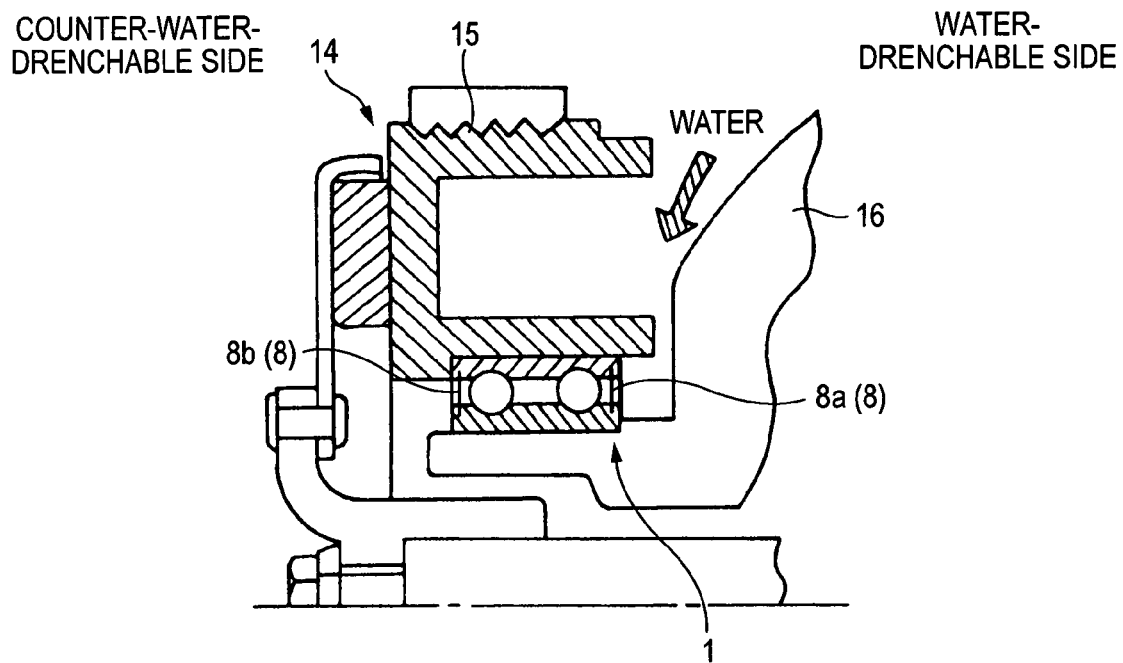
FIG. 4 shows a concrete embodiment and is a partially longitudinal section view of a power transmission pulley and a seal-type rolling bearing according to the invention, showing a state in which the latter is incorporated into the former.

Now, with reference to FIG. 4, description will be given below of a concrete embodiment in which the seal-type rolling bearing 1 according to the invention is incorporated into a power transmission pulley 14. By the way, FIG. 4 shows an example of a power transmission pulley into which a seal-type rolling bearing according to the invention can be incorporated, and thus the invention is not limited to this at all. Also, the present embodiment shows an embodiment in which a double-row angular ball bearing is incorporated but a seal-type rolling bearing to be incorporated into a power transmission pulley is not limited to this at all.

In FIG. 4, reference character 1 designates a seal-type rolling bearing according to the present embodiment, 15 stands for a pulley, and 16 represents a compressor housing.

In the case of the power transmission pulley 14 which is used to transmit power to a compressor in a refrigerating cycle for a vehicle such as a car, due to the structure thereof, the compressor and counter-compressor sides thereof are greatly different in the easy-to-be-drenched-with-water property from each other.

That is, on the compressor side (water-drenchable side), since it can be easily drenched with water when the water is drawn in from outside, there is disposed a contact seal 8a in which no air hole is formed in the lip 10 thereof; and, on the other hand, on the counter-compressor side (counter-water-drenchable side), because it is hard to be drenched with water, there is disposed a contact seal 8b in which an air hole is formed in the lip thereof.

When the hot-temperature bearing is cooled down suddenly due to the water drawn in from outside, for example, when the vehicle passes through a puddle while it is running, the internal pressure of the bearing is caused to lower down suddenly. However, as in the present embodiment, in case where the seal-type rolling bearing 1 according to the invention is incorporated into the power transmission pulley 14 of the vehicle, since the air hole 12 exists in the lip 10 of the counter-water-drenchable-side contact seal 8b, the outside air is drawn in to thereby be able to equalize the internal and external pressures of the bearing uniform with each other. Also, because no air hole is present in the lip 10 of the water-drenchable-side contact seat 8a, there is no possibility that the outside water can be drawn in.

Second Embodiment

Now, with reference to FIG. 5, description will be given below of a second concrete embodiment in which the seal-type rolling bearing 1 according to the invention is incorporated into an electro-magnetic clutch 17. By the way, in the present embodiment, there is shown a case in which a double-row angular ball bearing is incorporated; however, a seal-type rolling bearing to be incorporated into an electromagnetic clutch is not limited to this at all.

Figure 5:
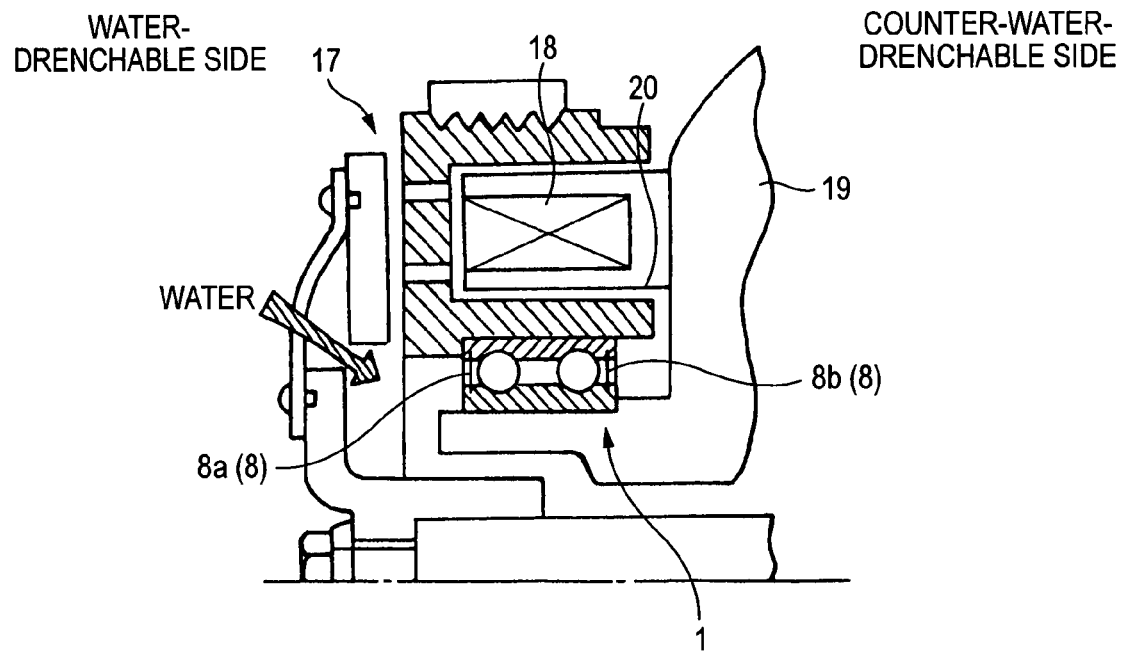
FIG. 5 shows a second concrete embodiment and is a partially longitudinal section view of an electromagnetic clutch and a seal-type rolling bearing according to the invention, showing a state in which the latter is incorporated into the former.

In FIG. 5, reference character 1 designates a seal-type rolling bearing shown in the present embodiment, 18 an electromagnetic coil, 19 a compressor housing, and 20 a long labyrinth, respectively.

In the case of the electromagnetic coil 18 which is used to transmit the rotation power of an engine for running a vehicle such as a car to a compressor in a refrigerating cycle for the vehicle intermittently, since the compressor side thereof is hard to be drenched with water due to the structure thereof, there is disposed a contact seal 8b with an air hole 12 formed in the lip 10 thereof; and, on the other hand, the counter-compressor side thereof is easy to be drenched with water when the water is drawn in from outside, there is disposed a contact seal 8a with no air hole formed in the lip 10 thereof.

When the hot-temperature bearing is suddenly cooled because it is drenched with water drawn in from outside, for example, when the vehicle passes through a puddle while running, the pressure of the interior of the bearing is lowered down suddenly. However, as in the present embodiment, in case where the seal-type rolling bearing 1 according to the invention is incorporated into the electromagnetic clutch 17, since the air hole 12 is present in the lip 10 of a contact seal 8b disposed on the counter-water-drenchable side of the bearing, the outside air can be drawn in to thereby be able to equalize the internal and external pressures of the bearing equal to each other. Also, because no air hole is present in the lip 10 of a contact seal 8a disposed on the water-drenchable side, there is no possibility that water can be drawn in from outside.

Although the invention has been described in detail and also with reference to the specific embodiments heretofore, it is obvious to a person skilled in the art that various changes and modifications are also possible without departing from the spirit and scope of the invention.

The present application is made based on the Japanese Patent Application (JP-Application 2001-348043) filed on Nov. 13, 2001 and the contents thereof are incorporated into the present application for reference.

INDUSTRIAL APPLICABILITY

Since the invention is structured in the above-mentioned manner, it can provide a seal-type rolling bearing which not only can secure a high seal sealing property but also can equalize the internal pressure of the bearing equal to the external pressure thereof. That is, a contact seal having an air hole is disposed on the side of the bearing that is hard to be drenched with water and a perfectly sealing contact seal without air seal is disposed on the side thereof that is easy to be drenched with water. Thanks to this, when the bearing held at a high temperature is drenched with water drawn in from outside and is thereby cooled down suddenly, not only the water can be prevented from being drawn in through the air hole excessively, but also the presence of the air hole in the opposite-side seal lip can prevent seal lip adsorption, seal removal and other problems which are possibly caused by a decrease or an increase in the pressure of the interior of the bearing.

The invention claimed is:

1. A rolling bearing for one of a power transmission pulley and an electromagnetic clutch, the bearing comprising:
   an inner ring;
   an outer ring;
   a water-drenchable side and a counter-water-drenchable side;
   a first contact seal plate disposed between the inner ring and the outer ring and on the counter-water-drenchable side of the bearing, wherein the first contact seal plate includes a lip leading end portion having a radially extending end surface, an air hole for controlling internal and external pressures of the bearing being formed in the radially extending end surface when in contact with one of the inner and outer rings, wherein the air hole extends in a radial direction of the bearing and the air hole is formed on a contacting surface of the first contact seal plate, which contacts with one of the inner and outer rings, in a radial direction, and wherein an entirety of the radially extending end surface, except for a portion in which the air hole is formed, contacts the one of the inner and outer rings; and
   a second contact seal plate without an air hole, wherein the second contact seal plate is disposed between an inner ring and an outer ring and on the water-drenchable side of the bearing.

2. The rolling bearing as set forth in claim 1, wherein the first contact seal plate comprises:
   an elastic member; and
   a core plate;
   wherein the air hole is formed on a contacting surface of the lip leading end portion of the first contact seal plate.

* * * * *